United States Patent
Heimer

(10) Patent No.: US 8,176,645 B2
(45) Date of Patent: May 15, 2012

(54) SPACER FOR PLACING RETROREFLECTORS OF VARYING SIZES ON A STANDARD DRILL ADAPTER

(75) Inventor: Dietmar Heimer, Mainz (DE)

(73) Assignee: AfM Technology GmbH, Aalen (DE)

( * ) Notice: Subject to any disclaimer, the term of this patent is extended or adjusted under 35 U.S.C. 154(b) by 0 days.

(21) Appl. No.: 12/988,798

(22) PCT Filed: Apr. 23, 2009

(86) PCT No.: PCT/EP2009/002963
§ 371 (c)(1),
(2), (4) Date: Dec. 6, 2010

(87) PCT Pub. No.: WO2009/130024
PCT Pub. Date: Oct. 29, 2009

(65) Prior Publication Data
US 2011/0067249 A1    Mar. 24, 2011

(30) Foreign Application Priority Data
Apr. 24, 2008  (EP) ...................................... 08007953

(51) Int. Cl.
*G01C 15/02* (2006.01)
(52) U.S. Cl. .......................................................... 33/293
(58) Field of Classification Search ...................... 33/293
See application file for complete search history.

(56) References Cited

U.S. PATENT DOCUMENTS

| | | | | |
|---|---|---|---|---|
| 5,119,564 A | * | 6/1992 | Hamilton et al. | 33/293 |
| 5,444,915 A | * | 8/1995 | Hedman | 33/293 |
| 5,611,398 A | * | 3/1997 | Duhn et al. | 166/75.11 |
| 5,861,956 A | | 1/1999 | Bridges et al. | |
| 6,964,113 B2 | * | 11/2005 | Bridges et al. | 33/702 |
| 7,197,834 B2 | * | 4/2007 | Heimer | 33/502 |
| 7,448,139 B2 | * | 11/2008 | McDonald | 33/293 |
| 7,557,936 B2 | * | 7/2009 | Dickinson | 356/620 |
| 7,698,826 B2 | * | 4/2010 | Hubbs | 33/293 |
| 2002/0148133 A1 | * | 10/2002 | Bridges et al. | 33/702 |
| 2004/0100705 A1 | * | 5/2004 | Hubbs | 359/819 |
| 2007/0016386 A1 | * | 1/2007 | Husted | 702/150 |
| 2007/0153297 A1 | * | 7/2007 | Lau | 356/620 |
| 2011/0067249 A1 | * | 3/2011 | Heimer | 33/293 |

FOREIGN PATENT DOCUMENTS
GB    2285550 A    7/1995

* cited by examiner

*Primary Examiner* — Yaritza Guadalupe-McCall
(74) *Attorney, Agent, or Firm* — IP Strategies

(57) ABSTRACT

The invention relates to an adapter top for adapting a drilling with 3D-coordinate measurement technology, which may be placed on drilling adapter with a first housing for a first retroreflector with a first diameter, and the adapter top comprises a second housing for a second retroreflector with a second diameter, wherein the second diameter is greater than the first diameter. The invention further relates to a positioning element for adapting a drilling with 3D-coordinate measurement technology by adjusting the relative position of a first standard drilling adapter with a first housing for a first retroreflector with a first diameter and an adapter fitting which is designed such that by combination of the first standard drilling adapter with the positioning element and the adapter fitting a standard drilling adapter with a second housing for a second retroreflector with second diameter can be emulated.

20 Claims, 3 Drawing Sheets

SECTION A-A

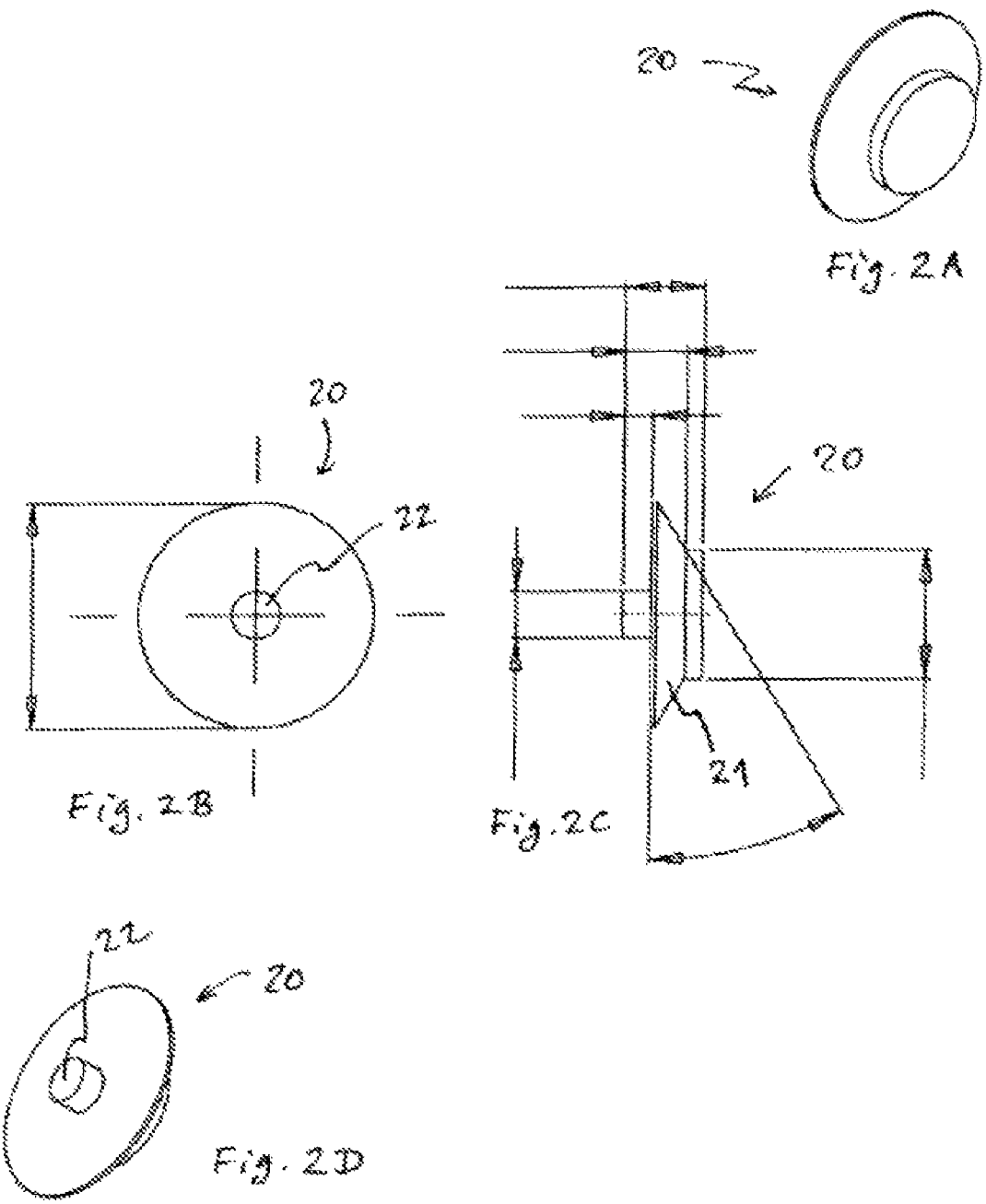

SPACER FOR PLACING RETROREFLECTORS OF VARYING SIZES ON A STANDARD DRILL ADAPTER

FIELD OF THE INVENTION

The invention relates to an adapter top for adapting a drilling with 3D-coordinate measurement technology and a positioning element for positioning the relative position of a first standard drilling adapter with a first housing for a first retroreflector with a first ball diameter and the adapter top. The invention furthermore relates to a drilling adapter as well as to a system for adapting drillings for 3D-coordinate measurement technology.

BACKGROUND OF THE INVENTION

In 3D-coordinate measurement technology, points are measured not only directly, but also indirectly. This is normally done with adapters which can be purchased from various manufacturers as accessories. The technology is established on the market and is mainly employed for measurements with 3D coordinate measuring machines. In the process, a drilling is, for example, adapted such that the intersecting point of the cylinder axis with a plane extending at right angles with respect to it corresponds to the point to be determined at a defined distance along the cylinder axis.

As for measurements for example with a laser tracker, a spherical retroreflector is used, such an adapter must possess a housing which is e.g. a section of a ball or a cone to fix the probe element at a defined distance. In measurements with a laser tracker, retroreflectors with varying diameters are used, so that for the adaptation of a drilling, several adapters (drilling adapters) for different retroreflector diameters are required. Basically, retroreflector diameters of 0.5" and 1.5", less common also 0.875", are here usual. There are several different standard values for the bore diameters, for example 6, 8, 10, 12, 14, 16, 18 mm.

Up to now, one adapter each was required for each bore diameter for the two or three retroreflector diameters. To be able to use two different retroreflectors e.g. for seven different bore diameters, a set of 14 adapters is required. This is disadvantageous as in particular the adapters for the large retroreflector diameter of 1.5" are expensive and heavy.

BRIEF SUMMARY OF THE INVENTION

In view of the disadvantages of prior art, the object underlying the invention is to overcome the above mentioned disadvantages.

The mentioned object is achieved by an adapter top for adapting a drilling with 3D-coordinate measurement technology, which can be placed on a drilling adapter with a first housing for a first retroreflector with a first ball diameter, the adapter top comprising a second housing for a second retroreflector with a second ball diameter, and the second diameter being greater than the first diameter.

By means of this adapter top, e.g. a standard drilling adapter with a housing for a retroreflector of a 0.5" diameter can be placed to thereby emulate e.g. a standard drilling adapter with a housing for a retroreflector with a ball diameter of 1.5". Here, it is ensured that the intersecting point of the axis of symmetry of the support surface with a plane extending at a right angle thereto has a predetermined distance from the point to be determined along the axis of symmetry.

A further development of the adapter top according to the invention is that the second housing can comprise a magnet. This magnet can be arranged, for example, in a recess of the second housing and serves to retain a placed retroreflector on the adapter top via magnetic forces.

Another further development of the adapter top is that the adapter top can comprise an opening into which a complementarily embodied pin of a positioning element can be inserted. In this manner, highly precise positioning for adapting the drilling to be measured with a retroreflector with a second diameter (e.g. 1.5") can be accomplished.

Another further development of the adapter top is that the second housing can be embodied with a support surface which is part of a cone or a ball. Thereby, the spherical second retroreflector can be stably applied onto the adapter top.

Another further development of the adapter top is that the adapter top can comprise a recess into which the housing of a drilling adapter can be inserted. By the housing of the drilling adapter being insertable into the recess, the housing of a standard drilling adapter can be submerged in the adapter top, whereby in combination, a standard drilling adapter for a retroreflector of a greater diameter (e.g. 1.5") can be emulated.

Another further development of the above mentioned further development is that the recess can be designed such that the drilling adapter can be inserted in a self-centering manner, preferably by means of a conical sloping of the edge of the recess. In this manner, the adapter top can be easily and securely placed onto the drilling adapter.

The above mentioned object is furthermore achieved according to the invention by a positioning element for adapting a drilling with 3D-coordinate measurement technology by positioning the relative position of a first standard drilling adapter with a first housing for a first retroreflector with a first ball diameter of an adapter top according to the invention or one of its'further developments, the positioning element being designed such that by combination of the first standard drilling adapter with the positioning element and with the adapter top, a standard drilling adapter with a second housing for a second retroreflector with a second ball diameter can be emulated.

The positioning element according to the invention provides a highly precise connection between a standard drilling adapter and the adapter top according to the invention.

A further development of the positioning element according to the invention is that the positioning element comprises a conical surface which corresponds to a complementary conical surface of the first housing. In this manner, an exact relative bearing of the positioning element and the first standard drilling adapter is achieved.

Another further development of the positioning element is that the positioning element can comprise a pin which can be inserted in a complementary opening of the adapter top. In this manner, an exact relative positioning and centering of the adapter top with respect to the positioning element, and consequently also with respect to the first standard drilling adapter can be achieved.

The object according to the invention is furthermore achieved by a drilling adapter for adapting a drilling with 3D-coordinate measurement technology, which comprises a standard drilling adapter with a first housing for a first retroreflector with a first ball diameter and a positioning element according to the invention or one of its further developments.

By this combination, one can make in a simple manner an adapter to be used with an adapter top according to the invention from a standard drilling adapter which is, for example, suited for a 0.5" retroreflector, so that a 1.5" retroreflector can be used in addition with the adapter top.

A further development of the drilling adapter is that the positioning element can be connected with the standard drilling adapter via a magnet, by gluing or screwing.

The above mentioned object is furthermore achieved by a system for adapting drillings for 3D-coordinate measurement technology, comprising: several drilling adapters according to the invention for varying bore diameters, as well as an adapter top according to the invention.

By this system, several drilling adapters for varying bore diameters are provided which each contain a standard drilling adapter and a positioning element according to the invention, and wherein only one adapter top for adaptation to a greater diameter of the retroreflectors is required. This has the advantage that only one complete set of standard drilling adapters for a small diameter of the retroreflectors must be bought and transported, and the adaptation to a greater retroreflector diameter is effected by the one adapter top, resulting in savings such that standard drilling adapters for greater diameters of the retroreflectors (1.5") are no longer necessary for varying bore diameters.

Selected preferred embodiments of the invention will be represented again below.

The invention comprises a novel adapter which permits to adapt all retroreflector diameters with only one adapter. Thereby, much less adapters are required for measurements of drillings which permits to adapt drillings more economically and flexibly.

The adapter consists of two parts, one self-centering magnetic housing for a 1.5" diameter retroreflector and one self-centering magnetic housing for a retroreflector with a 0.5" diameter. Both housings are fabricated such that they can be fitted into each other in a self-centering manner with a negligible small clearance, the housing for the 0.5" diameter retroreflector being provided with a highly precise pin for adapting the drilling to be measured.

The various further developments can be employed independent of each other or combined with each other.

Further preferred embodiments of the invention will be described below with reference to the drawings.

BRIEF DESCRIPTION OF THE DRAWINGS

FIGS. 2A-2D show various views of a positioning element according to the invention.

DETAILED DESCRIPTION OF THE INVENTION

Figure 1A:
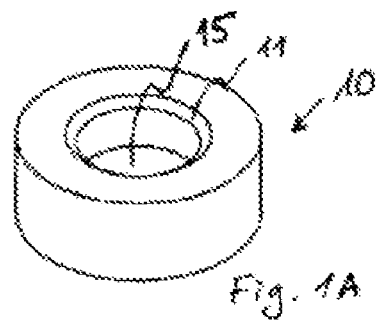
FIGS. 1A-1F show various views of the adapter top according to the invention.
Figure 1B:
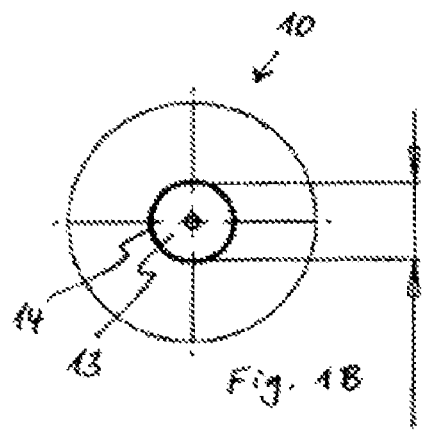
Figure 1F:
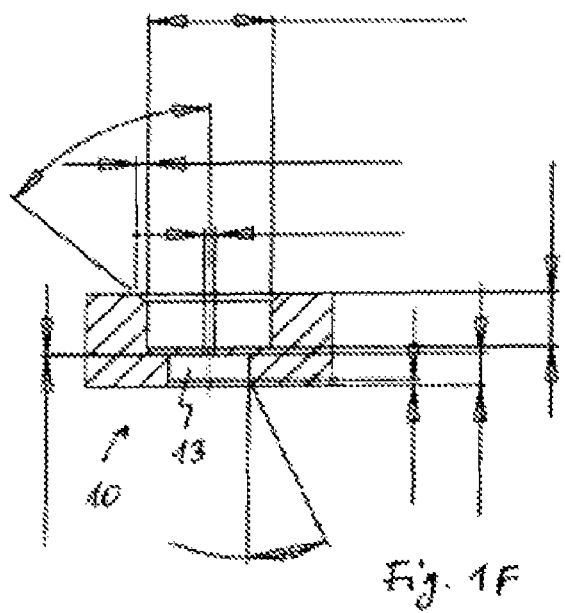
Figure 1E:
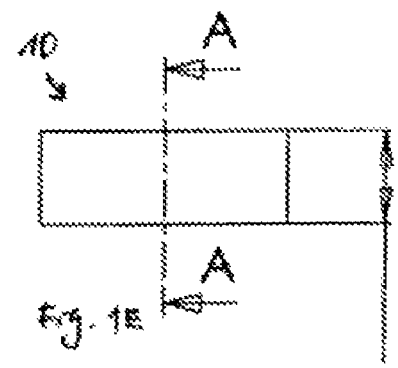
Figure 1C:
Figure 1D:
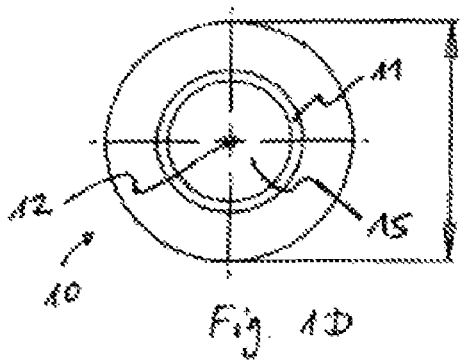

FIGS. 1A-1F show various views of the adapter top 10 according to the invention.

The adapter top 10 has a cylindrical design, preferably made of machining steel, and comprises a housing 11 with a support surface which is formed as part of a cone. A retroreflector having a ball diameter of 1.5" can be placed onto this support surface. In the recess 15, a magnet for magnetically retaining the retroreflector can be arranged.

The adapter top furthermore comprises a central opening 12 into which a complementarily embodied pin of a positioning element can be inserted. Moreover, the adapter top comprises a recess 13 into which the housing of a drilling adapter can be inserted. The recess 13 is designed such that the drilling adapter can be inserted in a self-centering manner. For this, a conical sloping 14 is provided at the edge of the recess 13.

FIGS. 2A to 2D show various views of a positioning element 20 according to the invention.

The positioning element serves the positioning of the relative position of a standard drilling adapter for retroreflectors of a diameter of 0.5" and an adapter top 10 according to the invention according to FIG. 1. The positioning element is designed such that by the combination of the standard drilling adapter with the positioning element 20 and with the adapter top 10, a standard drilling adapter for a retroreflector with a ball diameter of 1.5" is emulated, i.e. the mentioned combination has the same functionality as a standard drilling adapter for retroreflectors with a diameter of 1.5".

The positioning element comprises a conical surface 21 which corresponds to a conical surface of the housing of the standard drilling adapter for 0.5" retroreflectors in a complementary manner. Moreover, the positioning element 20 comprises a pin 22 which can be inserted into the complementary opening 12 of the adapter top 10.

Figure 3:
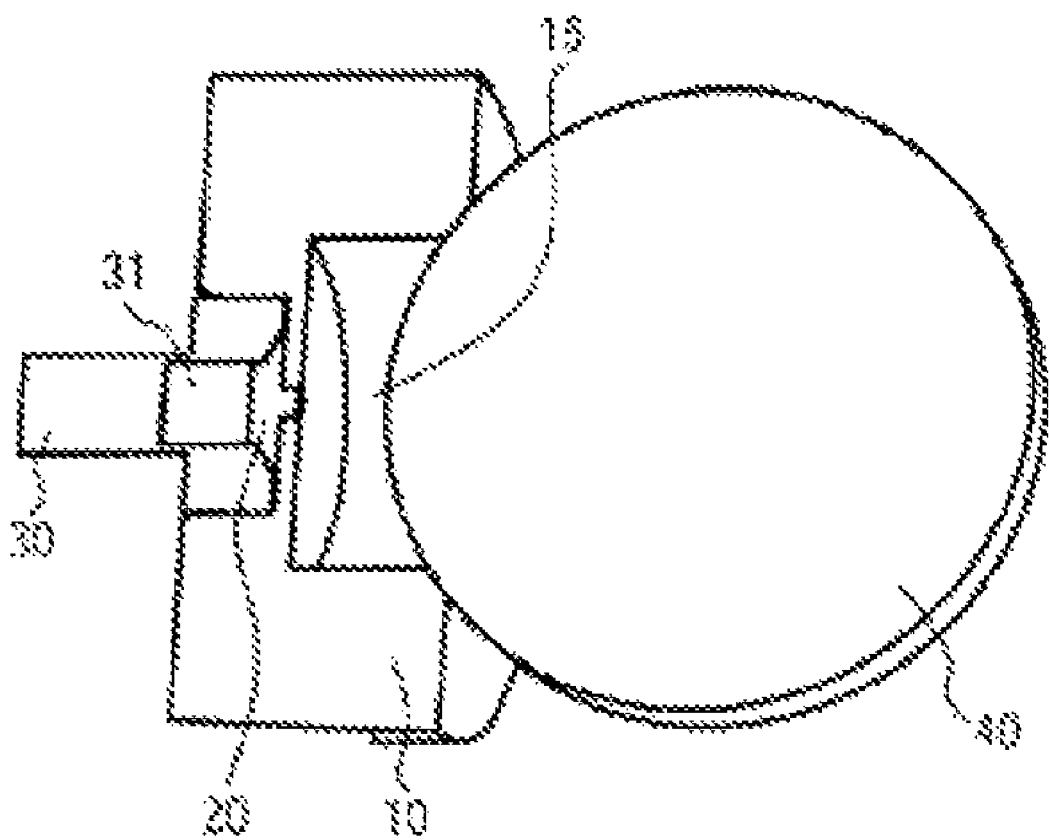
FIG. 3 shows a combination of the adapter top according to the invention according to FIG. 1 and of the positioning element according to the invention according to FIG. 2 with a standard drilling adapter.

FIG. 3 shows the combination of the adapter top 10 according to the invention according to FIG. 1 with the positioning element 20 according to the invention according to FIG. 2 and with a standard drilling adapter 30 for retroreflectors with a diameter of 0.5".

Furthermore, FIG. 3 shows a retroreflector 40 with a diameter of 1.5" placed onto this combination. This arrangement moreover comprises a magnet 31 for retaining the positioning element 20 on the standard drilling adapter 30.

The invention claimed is:

1. Adapter top for adapting a drilling with 3D-coordinate measurement technology, which can be placed on a drilling adapter with a first housing for a first retroreflector with a first ball diameter, the adapter top comprising a second housing for a second retroreflector with a second ball diameter, and the second diameter being greater than the first diameter; and
    having an opening into which a complementarily embodied pin of a positioning element can be inserted.

2. Adapter top according to claim 1, wherein the second housing comprises a magnet.

3. Adapter top according to claim 1, wherein the second housing is embodied with a support surface which is part of a cone or a ball.

4. Adapter top according to claim 1, wherein the adapter top comprises a recess into which the housing of a drilling adapter can be inserted.

5. Adapter top according to claim 4, wherein the recess is configured such that the drilling adapter can be inserted in a self-centering manner, preferably by means of a conical sloping of the edge of the recess.

6. Positioning element for adapting a drilling with 3D-coordinate measurement technology by positioning the relative position of a first standard drilling adapter with a first housing for a first retroreflector with a first ball diameter and an adapter top according to claim 1, which is designed such that by the combination of the first standard drilling adapter with the positioning element and with the adapter top, a standard drilling adapter with a second housing for a second retroreflector with a second ball diameter can be emulated.

7. Positioning element according to claim 6, wherein the positioning element comprises a conical surface which corresponds to a complementary conical surface of the first housing.

8. Positioning element according to claim 6, wherein the positioning element comprises a pin which can be inserted into a complementary opening of the adapter top.

9. Drilling adapter for adapting a drilling in 3D-coordinate measurement technology, comprising:
   a standard drilling adapter with a first housing for a first retroreflector with a first ball diameter, and
   a positioning element according to claim 6.

10. Drilling adapter according to claim 9, wherein the positioning element is connected to the standard drilling adapter via a magnet, by gluing or screwing.

11. System for adapting drillings for 3D-coordinate measurement technology, comprising:
   several drilling adapters for varying bore diameters, each according to claim 9, and
   an adapter top for adapting a drilling with 3D-coordinate measurement technology, which can be placed on a drilling adapter with a first housing for a first retroreflector with a first ball diameter, the adapter top comprising a second housing for a second retroreflector with a second ball diameter, and the second diameter being greater than the first diameter.

12. Positioning element for adapting a drilling with 3D-coordinate measurement technology by positioning the relative position of a first standard drilling adapter with a first housing for a first retroreflector with a first ball diameter and an adapter top for adapting a drilling with 3D-coordinate measurement technology,
   wherein the adapter top can be placed on a drilling adapter with a first housing for a first retroreflector with a first ball diameter, the adapter top comprising a second housing for a second retroreflector with a second ball diameter, and the second diameter being greater than the first diameter,
   wherein the positioning element is designed such that by the combination of the first standard drilling adapter with the positioning element and with the adapter top, a standard drilling adapter with a second housing for a second retroreflector with a second ball diameter can be emulated,
   wherein the positioning element comprises a pin which can be inserted into a complementary opening of the adapter top.

13. Positioning element Adapter top according to claim 12, wherein the second housing comprises a magnet.

14. Positioning element according to claim 12, wherein the second housing is embodied with a support surface which is part of a cone or a ball.

15. Positioning element according to claim 12, wherein the adapter top comprises a recess into which the housing of a drilling adapter can be inserted.

16. Positioning element according to claim 15, wherein the recess is configured such that the drilling adapter can be inserted in a self-centering manner, preferably by means of a conical sloping of the edge of the recess.

17. Positioning element according to claim 12, wherein the positioning element comprises a conical surface which corresponds to a complementary conical surface of the first housing.

18. Drilling adapter for adapting a drilling in 3D-coordinate measurement technology, comprising:
   a standard drilling adapter with a first housing for a first retroreflector with a first ball diameter, and
   a positioning element according to claim 12.

19. Drilling adapter according to claim 18, wherein the positioning element is connected to the standard drilling adapter via a magnet, by gluing or screwing.

20. System for adapting drillings for 3D-coordinate measurement technology, comprising:
   several drilling adapters for varying bore diameters, each according to claim 18, and
   an adapter top for adapting a drilling with 3D-coordinate measurement technology, which can be placed on a drilling adapter with a first housing for a first retroreflector with a first ball diameter, the adapter top comprising a second housing for a second retroreflector with a second ball diameter, and the second diameter being greater than the first diameter.

* * * * *